United States Patent
Ney et al.

(10) Patent No.: US 6,319,592 B1
(45) Date of Patent: Nov. 20, 2001

(54) DECORATIVE FLOOR MAT FOR USE WITH CHAIR

(76) Inventors: David Andrew Ney, 880 Oakwood Dr.; Roger Alan Payne, 450 Maplewood Dr., both of Alliance, OH (US) 44601

(*) Notice: Subject to any disclaimer, the term of this patent is extended or adjusted under 35 U.S.C. 154(b) by 0 days.

(21) Appl. No.: 09/665,470

(22) Filed: Sep. 20, 2000

(51) Int. Cl.⁷ .................................................... B32B 3/00
(52) U.S. Cl. .......................... 428/195; 428/67; 428/142; 428/203; 428/913.3
(58) Field of Search .................. 428/195, 67, 913.3, 428/203, 142

(56) References Cited

U.S. PATENT DOCUMENTS 4,472,471 * 9/1984 Klein et al. ............................ 428/172
5,015,516 * 5/1991 Iussi et al. ............................ 428/143
5,876,825 * 3/1999 Daley .................................... 428/67
6,103,333 * 8/2000 Keith .................................... 428/99

* cited by examiner

Primary Examiner—Cathy Lam
(74) Attorney, Agent, or Firm—Buckingham, Doolittle & Burroughs, LLP; David P. Dureska

(57) ABSTRACT

A protective floor mat for use in supporting a chair on a floor comprises a mat base for contact with the floor, and a graphic layer having a decorative pattern. A first adhesive material is disposed between and interconnects the mat base and the graphic layer. The floor mat also comprises a transparent upper protective layer for contact by the chair. A second adhesive material is disposed between and interconnects the upper protective layer and the graphic layer. Because the graphic layer covers the mat base, the mat base may be made from regrind or reprocessed plastic material. The graphic layer is visible through the transparent protective layer.

10 Claims, 3 Drawing Sheets

DECORATIVE FLOOR MAT FOR USE WITH CHAIR

BACKGROUND OF THE INVENTION

1. Technical Field

The present invention relates to a floor mat for use with a chair. In particular, the present invention relates to a floor mat having a decorative pattern and on which a chair, such as a desk chair, may be used.

2. Description of the Prior Art

A typical floor mat for a use with a chair, such as a desk chair, is made of clear or translucent plastic material. Thus, a viewer is able to see the carpet on which the floor mat is placed. The floor mat is not, however, invisible, and can be visually out of place in an office environment.

The floor mat, because it is clear, must be made from a relatively high quality material, free of imperfections or color. Such a material is relatively expensive.

SUMMARY OF THE INVENTION

The present invention is a protective floor mat for use in supporting a chair on a floor. The floor mat comprises a mat base for contact with the floor, and a graphic layer having a decorative pattern. A first adhesive material is disposed between and interconnects the mat base and the graphic layer. The floor mat also comprises an upper protective layer for contact by the chair. A second adhesive material is disposed between and interconnects the upper protective layer and the graphic layer.

The mat base 12 may be made from a plastic material such as regrind or reprocessed material, because it is not visible in the finished mat. Use of such a material can result in significant cost savings as compared to using a first quality floor mat material, which must be clear and free of imperfections or color.

The decorative pattern on the graphic layer of the mat is visible through the upper protective layer, to provide an improved appearance to the floor mat.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
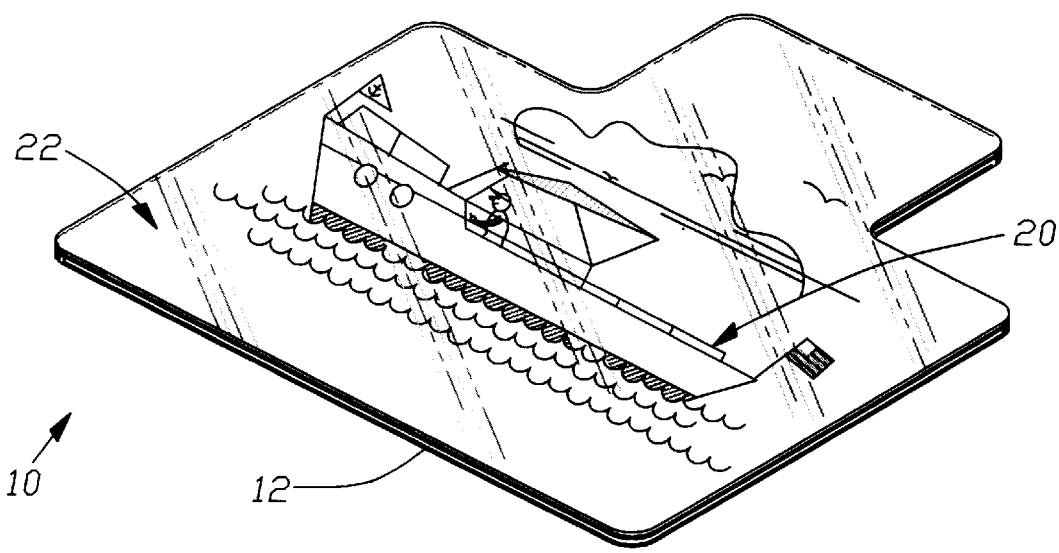
FIG. 1 is a perspective view of a floor mat constructed in accordance with the present invention.
Figure 2:
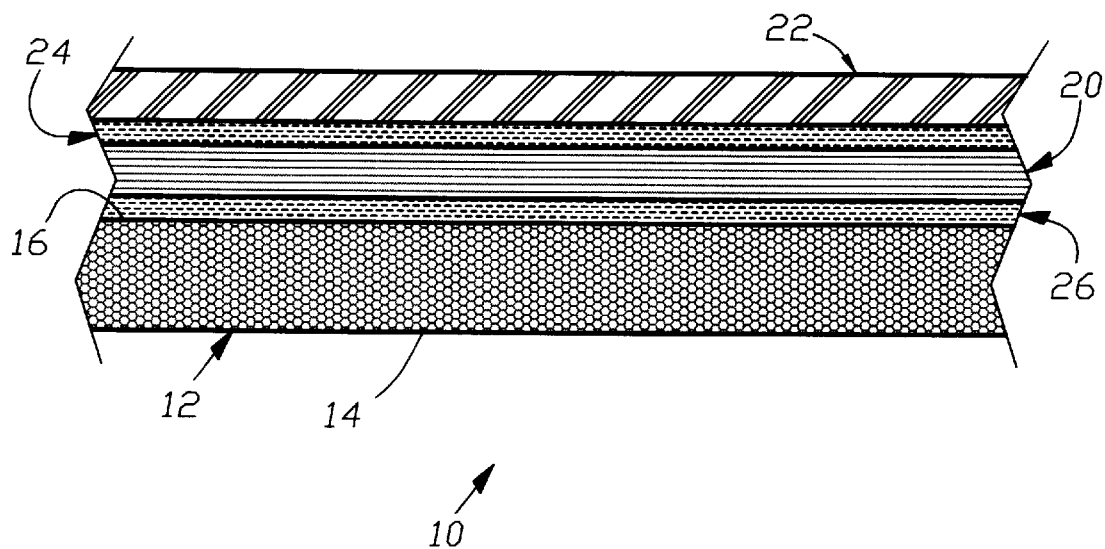
FIG. 2 is a sectional view through the floor mat of FIG. 1.

The present invention relates to a floor mat for use with a chair. In particular, the present invention relates to a floor mat having a decorative pattern and on which a chair, such as a desk chair, may be used. As representative of the present invention, FIG. 1 illustrates a floor mat 10 constructed in accordance with the present invention.

The floor mat 10 includes a mat base 12. The mat base 12 has a lower side surface 14 for contact with the floor and an upper side surface 16.

The mat base 12 may be the type of floor mat that is commonly sold in a transparent or translucent form with no decoration. This material may be a rigid or semi-rigid PVC, polycarbonate, or other similar "plastic" material. Alternatively, the mat base 12 may be made from a similar but "lower quality" (in appearance only) plastic material such as regrind or reprocessed material. This is because the mat base 12 itself is not visible in the finished mat 10. Use of such a material can result in significant cost savings as compared to using a first quality floor mat material, which must be clear and free of imperfections or color.

The mat base may be of a thickness typical for floor mats used under desk chairs. The mat base is thick enough to support a desk chair in its range of movement relative to a desk on a carpet or a hard surface. The mat base may range in thickness from about 0.17 inches to about 0.23 inches.

The floor mat 10 also includes a printed graphic 20 and a protective layer 22. A first adhesive material 24 is disposed between the protective layer 22 and the printed graphic 20. A second adhesive material 26 is disposed between the printed graphic 20 and the mat base 12.

Figure 3:
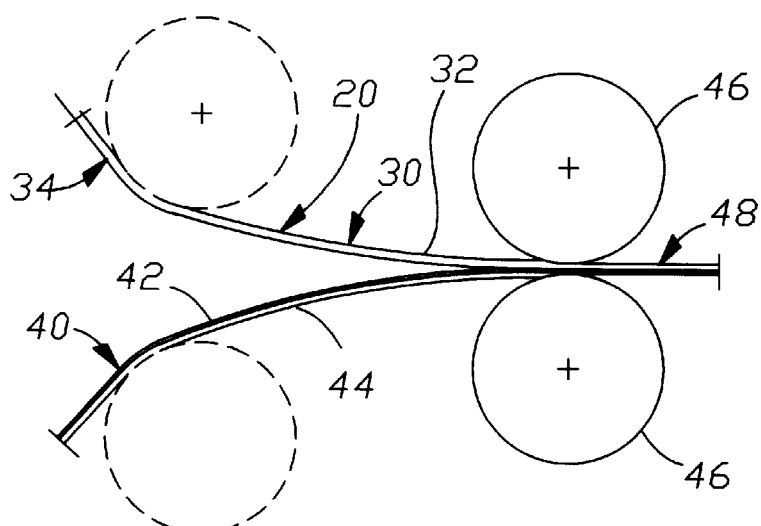
FIG. 3 is a schematic illustration of one step in a first process of making the floor mat of FIG. 1.
Figure 4:
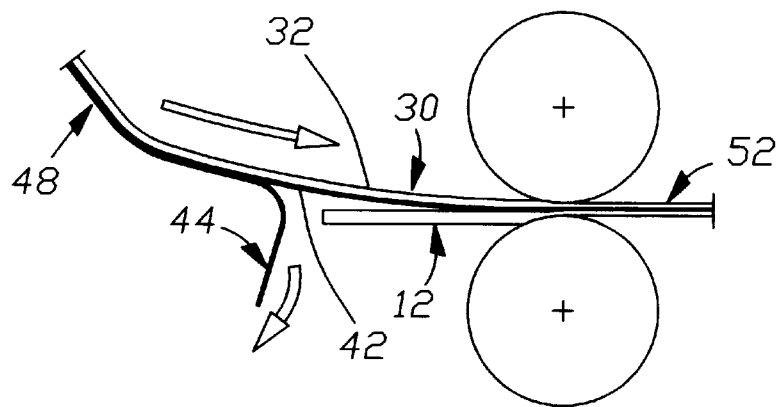
FIG. 4 is a schematic illustration of a subsequent step in the process of FIG. 3.
Figure 5:
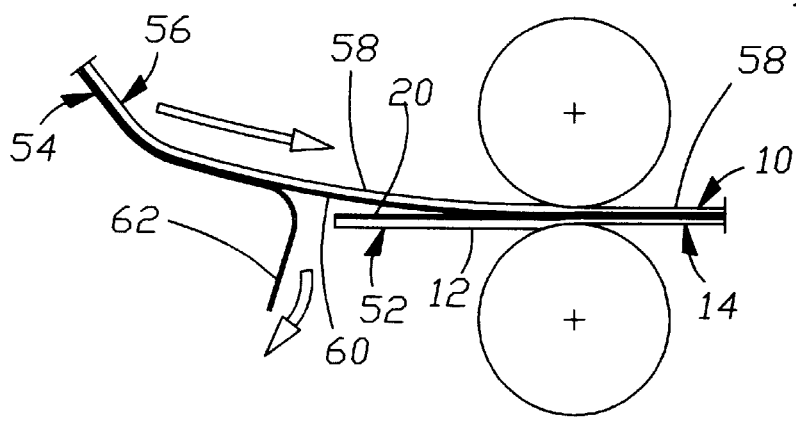
FIG. 5 is a schematic illustration of a subsequent step in the process of FIG. 3.

FIGS. 3–5 illustrate a first method of making the floor mat 10. As shown in FIG. 3, the printed graphic 20 is provided on a non-adhesive material 30. The graphic 30 is printed on one side surface 32, and may be blank on the other side surface 34. The printed graphic 20 may be printed with a commercial printing method as used for large scale graphics. Such methods include, but are not limited to, rotogravure, silk screen, and ink jet printing. The graphic 20 is typically made from a plastic print film, or paper, provided in sheet or roll form, and typically in a thickness of about 0.002 inches or more. (The recited dimensions are not to be considered limiting.)

A first adhesive assembly 40 is provided that has an exposed adhesive material 42 on one side surface, and an adhesive covered by release paper 44 on the other side surface. (The adhesives used in the floor mat 10 should be strong enough to prevent relative sliding movement of the mat base 12, the graphic layer 20, and the protective layer 56, during the intended lifetime of use of the floor mat.)

The graphic 30 and the first adhesive assembly 40 are laminated by rollers 46 into a graphic sub-assembly 48 as shown schematically in FIG. 3. The adhesive material 42 of the first adhesive assembly 40 sticks onto the printed graphic 30. The release paper 44 is on one side of the resulting graphic sub-assembly 48, and the printed graphic 32 is on the other side of the graphic sub-assembly 48.

A semi-rigid mat base 12 is provided, and the graphic sub-assembly 48 is assembled onto the mat base as shown schematically in FIG. 4. Specifically, the release paper 44 is peeled off from the graphic sub-assembly 48, and the graphic sub-assembly is applied to the mat base 12. The first adhesive material 42 sticks onto the mat base 12 and secures the graphic sub-assembly 48 to the mat base. The printed side 32 of the graphic 30 is on one side of the resulting mat sub-assembly 52, and the mat base 12 forms the other side of the resulting mat sub-assembly 52.

A protective layer sub-assembly 54 is provided. The protective layer sub-assembly 54 includes a protective layer 56 one side 58 of which is finished and the other side of which has a second adhesive material 60 with a release paper 62.

The protective layer 56 is made from a clear and abrasion resistant material, such as (but not limited to) polycarbonate. This material is provided in sheet or roll form, typically in a thickness of about 0.005 inches plus or minus 0.002 inches. (The recited dimensions are not to be considered limiting.) Other materials with sufficient abrasion resistance, such as a hard PVC film, could be used.

The protective layer sub-assembly 54 is then assembled onto the mat sub-assembly 52 as shown schematically in FIG. 5. Specifically, the release paper 62 is peeled off, and the second adhesive material 60 of the protective layer sub-assembly 54 is applied to the printed side 32 of the printed graphic 30. The second adhesive material 60 secures the protective layer sub-assembly 54 to the printed graphic 30 and, thereby, to the mat base 12. The finished surface 58 of the transparent protective layer 56 is on one side of the resulting mat 10 (covering the printed graphic 20), and the bottom surface 14 of the mat base 12 is on the other side of the resulting mat. As a result, the printed graphic is visible through the protective layer, to provide a decorative and pleasing appearance to the finished floor mat 10.

The finished floor mat 10 may be of a size typical for floor mats used under desk chairs. The mat 10 is large enough to support a desk chair in its range of movement relative to a desk. The mat 10 may range in size from about 36"×48" to about 60"×60" or more. (The recited dimensions are not to be considered limiting.) The mat 10 may be manufactured to a custom size in which the graphic 20 covers all or substantially all of the mat base 12. Alternatively, the graphic 20 may cover only a portion of the mat base 12.

Figure 6:
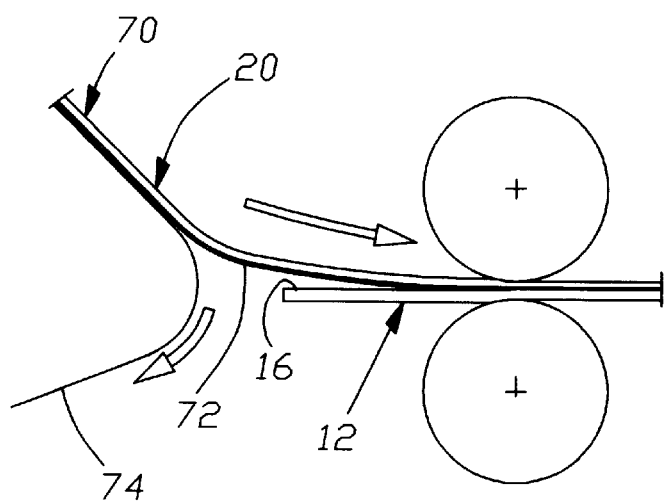
FIG. 6 is a schematic illustration of one step in a second process of making the floor mat of FIG. 1.
Figure 7:
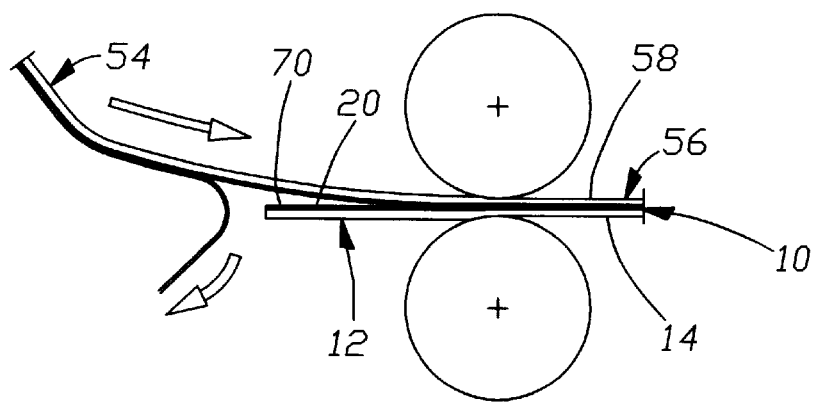
FIG. 7 is a schematic illustration of a subsequent step in the process of FIG. 6.

FIGS. 6 and 7 illustrate a second method of making the floor mat 10. The difference between this second method and the first method described above is that the graphic 20 is printed on a material 70 having an adhesive lower side surface 72. The adhesive lower surface 72 is covered with a release paper 74. The release paper 74 is removed as shown in FIG. 6 and the printed graphic 20 is then laminated onto the upper side surface 16 of the mat base 12.

A protective layer sub-assembly 54 is then laminated onto the printed graphic 70, in a manner as shown in FIG. 7, similar to the manner shown in FIG. 5 above. In the resulting finished floor mat 10, the transparent finished surface 58 of the transparent protective layer 56 is on one side of the resulting mat 10 (covering the printed graphic 20), and the bottom surface 14 of the mat base 12 is on the other side of the resulting mat.

Figure 8:
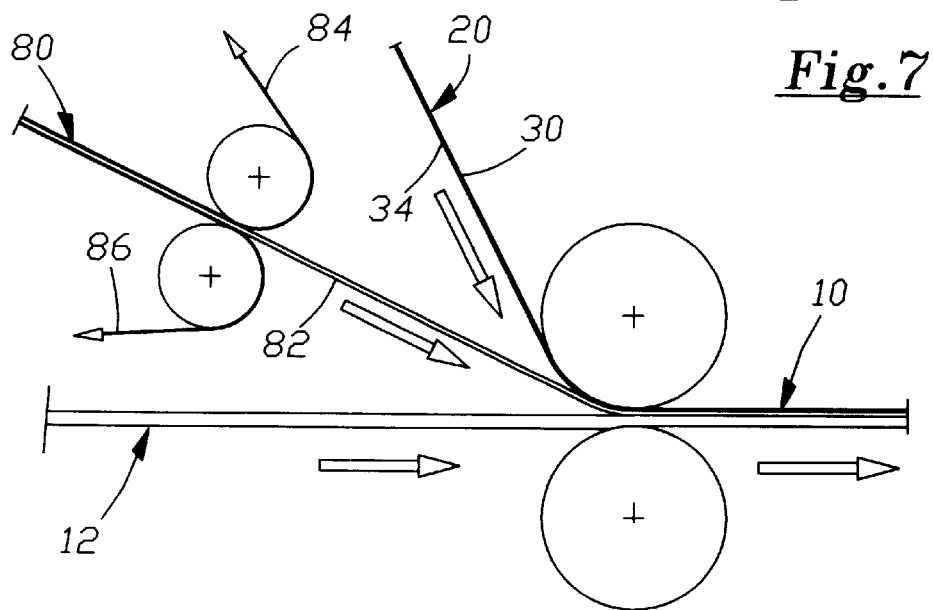
FIG. 8 is a schematic illustration of one step in a third process of making the floor mat of FIG. 1.

FIG. 8 illustrates a third method of making the floor mat 10. In this method, the printed graphic 20 is provided on a non-adhesive material 30 as in the first method. A first adhesive assembly 80 is provided in the form of an adhesive film 82 having release paper 84 and 86 on both sides. The release paper 84 and 86 is removed from both sides of the first adhesive assembly 80, and the adhesive film 82 is applied between the non-printed side 34 of the graphic material 30 and the mat base 12. This may be done in two steps, first applying the adhesive material 82 to the mat base 12, then assembling the graphic 30 onto the mat base. A transparent protective layer 56 (not shown) is then applied with a second adhesive material, in the manner illustrated with reference to FIG. 5.

From the above description of the invention, those skilled in the art will perceive improvements, changes and modifications in the invention. For example, the first and/or second adhesive materials could be provided as a heat activated and/or hot melt adhesive material on the graphic or on the protective layer, thus eliminating the release film. Such improvements, changes and modifications within the skill of the art are intended to be covered by the appended claims.

Having described the invention, we claim:

1. A protective floor mat for use in supporting a chair on a floor, comprising:

a generally rigid mat base for contact with the floor;

a graphic layer having a decorative pattern;

a first adhesive material disposed between and interconnecting said mat base and said graphic layer;

a generally rigid upper protective layer for contact by the chair; and a second adhesive material disposed between and interconnecting said upper protective layer and said graphic layer.

2. A floor mat as set forth in claim 1 wherein said graphic layer has a non-adhesive lower surface and said first adhesive material is a double sided adhesive material provided separately from said graphic layer for contact with said lower surface of said graphic layer and with an upper surface of said mat base to secure said graphic layer to said mat base.

3. A floor mat as set forth in claim 1 wherein said graphic layer has a lower surface that is adhesive and said graphic layer is movable into position on said mat base with said adhesive lower surface in contact with an upper surface of said mat base to secure said graphic layer to said mat base.

4. A floor mat as set forth in claim 1 wherein said upper protective layer has a lower surface that is adhesive and said upper protective layer is movable into position on said graphic layer with said adhesive lower surface in contact with an upper surface of said graphic layer to secure said upper protective layer to said graphic layer.

5. A floor mat as set forth in claim 1 wherein said mat base is made from regrind or reprocessed plastic material.

6. A floor mat as set forth in claim 5 wherein said upper protective layer is transparent and said graphic layer is visible through said upper protective layer.

7. A floor mat as set forth in claim 1, wherein said first and second adhesive materials are adhesive materials that cure without the application of heat, said mat base and said graphic layer and said upper protective layer being bonded together under pressure.

8. A floor mat as set forth in claim 1, wherein said first and second adhesive materials are adhesive materials that cure with the application of heat and that are free of release paper when provided on said mat base or said graphic layer or said upper protective layer.

9. A floor mat as set forth in claim 1, wherein said mat base and said graphic layer have facing surfaces; and wherein said first adhesive material is disposed on generally the entire area of said facing surfaces.

10. A floor mat as set forth in claim 1 wherein said graphic layer and said upper protective layer have facing surfaces; and wherein said second adhesive material is disposed on generally the entire area of said facing surfaces.

* * * * *